United States Patent [19]

Tsujioka et al.

[11] Patent Number: 4,580,236

[45] Date of Patent: Apr. 1, 1986

[54] GRAPHIC DISPLAY APPARATUS WITH A VECTOR GENERATING CIRCUIT

[75] Inventors: Shigeo Tsujioka, Higashiyamato; Eiji Okamura, Owariasahi; Mitsuo Ooyama; Kimiaki Ando, both of Hachioji; Seiichi Kanema, Tokyo; Mitsugu Yoneyama, Tokorozawa; Toshihisa Aoshima, Tokyo; Kiyoshi Umezawa, Owariasahi, all of Japan

[73] Assignee: Hitachi, Ltd., Tokyo, Japan

[21] Appl. No.: 497,575

[22] Filed: May 24, 1983

[30] Foreign Application Priority Data

May 26, 1982 [JP] Japan .................................. 57-87946

[51] Int. Cl.[4] ...................... G06F 3/00; G06F 15/626; G09G 1/06

[52] U.S. Cl. .................................... 364/719; 340/732; 364/521; 364/900

[58] Field of Search ............... 364/718, 719, 730, 518, 364/710, 200 MS File, 900 MS File, 521; 340/727, 728, 732, 739

[56] References Cited

U.S. PATENT DOCUMENTS

| | | | |
|---|---|---|---|
| 3,883,728 | 5/1975 | Schwartz et al. | 364/732 |
| 3,906,480 | 9/1975 | Schwartz et al. | 340/739 |
| 4,163,286 | 7/1979 | Reins et al. | 364/719 |
| 4,272,808 | 6/1981 | Hartwig | 364/719 |
| 4,445,115 | 4/1984 | Rudgard | 340/728 |
| 4,491,836 | 1/1985 | Collmeyer et al. | 340/732 |

OTHER PUBLICATIONS

Bresenham, "Algorithm for Computer Control of a Digital Plotter", *IBM Systems Journal*, vol. 4, #1, pp. 25-30, 1965.

*Primary Examiner*—James D. Thomas
*Assistant Examiner*—Dale M. Shaw
*Attorney, Agent, or Firm*—Antonelli, Terry & Wands

[57] ABSTRACT

A graphic display apparatus for generating a vector comprises registers for storing a value R of a vector discrimination, a positive increment P and a negative increment N, and flip-flops for storing magnitude information of ΔX, ΔY, and ΔX and ΔY. An address counter of a refresh memory is counted up or down in accordance with the contents of those flip-flops. A control circuit for updating the value R of the vector discrimination is also provided, so that the vector can be generated at a high speed. The registers and the flip-flops are constructed in two stages so that data for generating the next vector can be prepared while the current vector is generated.

3 Claims, 7 Drawing Figures

GRAPHIC DISPLAY APPARATUS WITH A VECTOR GENERATING CIRCUIT

BACKGROUND OF THE INVENTION

The present invention relates to a graphic display apparatus with a vector generating circuit.

As a vector generating system in the graphic display apparatus, the Bresenham system is been well known. It is described in detail in an article "Algorithm for Computer Control of a Digital Plotter" by J. E. Bresenham, IBM Syst. J4(1), 25-30, 1965. Therefore, it is briefly explained here.

As shown in FIG. 2, when a start point $P_s$ and an end point $P_E$ of a vector are given, $q_m$ and $q_n$ are compared in order to select one of points $P_i$ and $P_j$ to be displayed next to $P_s$. The selected one is closer to a straight line to be displayed. In an example of the vector shown in FIG. 2, $$Y = \frac{\Delta Y}{\Delta X} * X \quad (1)$$

$$q_m = \frac{\Delta Y}{\Delta X} \quad (2)$$

$$q_n = 1 - \frac{\Delta Y}{\Delta X} \quad (3)$$

where $\Delta X$ is a distance in X-direction and $\Delta Y$ is a distance in Y-direction. An initial value $R_o$ in a discrimination R is defined by the following, $$R_o = \Delta X^*(q_m - q_n) = 2^*\Delta Y - \Delta X \quad (4)$$

When $R_o \geqq 0$, $P_j$ is selected, and when $R_o < 0$, $P_i$ is selected. When one of points $P_{i+1}$ and $P_{j+1}$ is selected, the next value $R_1$ for the discrimination is given by the following, $$R_1 = \Delta X^*(q_{m+1} - q_{n+1}) = R_0 + 2^*(\Delta Y - \Delta X) \quad (5)$$

if $P_j$ was selected previously, and $$R_1 = \Delta X^*(q_{m+1} - q_{n+1}) = R_0 + 2^*\Delta Y \quad (6)$$

if $P_i$ was selected previously. Depending on which one of $P_j$ and $P_i$ was selected previously, that is, on a sign of the previous discrimination $R_0$, an increment $2^*(\Delta X - \Delta Y)$ or $2^*\Delta Y$ is added to the discrimination $R_0$ in order to obtain the next discrimination $R_1$. In the illustrated example, all of $\Delta X$, $\Delta Y$ and $\Delta X - \Delta Y$ are positive or zero. Depending on the combination of the signs of $\Delta X$, $\Delta Y$ and $\Delta X - \Delta Y$, the value of the discrimination R differs from that described above and the address is determined by incrementing or decrementing. Many prior art pattern processing apparatus generate the vectors by the Bresenham system but they take a long time to generate the vectors because the addresses are generated by microprograms.

The vector generation method is briefly explained below. FIG. 1 shows a graphic display apparatus previously considered and attempted by the present inventors but not known in public. Numerals 101-103 denote registers for storing an initial value R, a positive increment P and a negative increment N, respectively, numeral 108 denotes an arithmetic logic unit (ALU), numeral 109 denotes a circuit for generating an address of a microinstruction, numeral 110 denotes a control storage for storing the microinstruction, numeral 111 denotes a microinstruction decode circuit, numeral 112 denotes a register for holding an X-direction end address $X_E$ of a vector, numeral 113 denotes a register for holding a Y-direction end address $Y_E$, numeral 114 denotes a counter for holding an X-direction write address $X_s$, numeral 115 denotes a register for holding a Y-direction write address $Y_s$, numerals 116 and 117 denote compare circuits, numeral 118 denotes an AND gate, numeral 119 denotes a refresh memory for storing information of each picture cell at each position corresponding to the picture cell on a display device (not shown), numeral 120 denotes a write timing signal generating circuit for the refresh memory 119, numeral 121 denotes an AND gate, and numeral 122 denotes a write data forming circuit for the refresh memory 119. The method for generating the vector in the above graphic display apparatus is now explained in connection with an example in which a vector from a point ($X_o$, $Y_o$) to a point ($X_3$, $Y_2$) shown in FIG. 2 is generated. Based on the Bresenham algorithm, the initial value R of the discrimination, the positive increment P and the negative increment N are calculated by the following formulas.

$$R = 2^*\Delta Y - \Delta X \quad (1)$$

$$P = 2^*(\Delta Y - \Delta X) \quad (2)$$

$$N = 2^*\Delta Y \quad (3)$$

where $\Delta Y$ is a Y-direction component ($Y_E - Y_s$) of the vector, and $\Delta X$ is an X-direction component ($X_E - X_s$). In the example shown in FIG. 2, $\Delta Y = 2$ and $\Delta X = 3$, and R, P and N are 1, $-2$ and 4, respectively. It is now assumed that R, P and N are set in the registers 101-103 of FIG. 1, the start point ($X_0$, $Y_0$) is set in the counters 114 and 115 and the end point ($X_3$, $Y_2$) are set in the registers 112 and 113. FIG. 3 shows only a portion of vector generating microprogram stored in the control storage 110 of FIG. 1. Referring to the microprogram of FIG. 3, when a microinstruction 301 is fetched from the control storage 110, a control line 144 for designating the writing to the refresh memory 119 is enabled by the decoder 111. The signal on the control line 144 is ANDed with an output timing signal 135 from the timing signal generator 120 by the AND gate 121 to produce a write pulse 133 to the refresh memory 119. The outputs of the counters 114 and 115 are supplied to the refresh memory 119 as addresses. In the present example, a dot is generated at the position ($X_0$, $Y_0$) shown in FIG. 2. The data to be written into the refresh memory 119 is determined by an output signal 136 from the data generator 122. When the refresh memory 119 comprises a plurality of planes each corresponding to one color, the data may be a plurality of bits each corresponding to one color. In the present example, however, for the sake of simplicity, the colors are ignored and it is assumed that the refresh memory 119 comprises one plane which stores only intensity data. It is assumed that the data line 136 always carries a logical "1" signal. When a microinstruction 302 is next fetched from the control storage 110, the microinstruction address generating circuit 109 generates an address of a microinstruction 303 if the conditioning signal 134 is valid, and generates an address of a microinstruction 308 if the signal 134 is invalid. The conditioning signal 134 is an AND function of the signals 137 and 138 and the compare circuit 116 renders the signal 134 valid when the contents of the registers 112 and 114 are equal, and the compare circuit 117 renders the signal 138 valid when the contents of the registers 113 and 115 are equal. In the present example, the conditioning signal 134 is valid when the address reaches the point ($X_3$, $Y_2$). Accordingly, when the address is at the point ($X_0$, $Y_0$), the microinstruction address generating circuit 109 generates the address of the microinstruction 303 as the next microinstruction address. When the microinstruction 303 is fetched, the control line 140 is enabled by the decoder 111. The control line 140 causes the counter 114 to count up. The microinstruction 304 is next fetched and the microinstruction address generating circuit 109 generates the address of the microinstruction 305 as the address of the microinstruction to be next fetched if the conditioning signal 139 is valid, and generates the address of the microinstruction 307 if the conditioning signal 139 is invalid. The conditioning signal is rendered valid by the ALU 108 when the content of the register 101 is positive. In the present example, the content R is 1 and the microinstruction 305 is next fetched. The microinstruction 305 renders the control line 142 valid, which causes the counter 115 to count up. When the microinstruction 306 is next fetched, the contents of the registers 101 and 102 are added in the ALU 108 to produce a sum and the sum is stored in the register 101 through a bus 130. A control signal therefor is similar to a control signal in a conventional microprogram controlled system and hence it is omitted in FIG. 1. The microinstruction 307 is executed when the conditioning signal 139 is invalid. It instructs to add the contents of the registers 101 and 103 and store a sum in the register 101. After the execution of the microinstruction 306 or 307, the address generating circuit 109 is controlled to fetch the microinstruction 301. The above microinstructions are executed until the conditioning signal 134 becomes valid. As a result, dots are generated at points ($X_0$, $Y_0$), ($X_1$, $Y_1$), ($X_2$, $Y_1$) and ($X_3$, $Y_2$) shown in FIG. 2, so that a vector is generated.

In the vector generation method, in the graphic display apparatus described above, five to six microinstructions are needed to generate one dot, the vector cannot be generated at a high speed.

SUMMARY OF THE INVENTION

It is an object of the present invention to provide a graphic display apparatus capable of generating a vector at a high speed.

In order to achieve the above object, in accordance with an aspect of the present invention, there are provided registers for storing the value R of the vector discrimination, the positive increment P and the negative increment N, and flip-flops for storing magnitude information of ΔX, ΔY, and ΔX-ΔY. Depending on the contents of those flip-flops, the address counter of the refresh memory is counted up or down. In addition, a control circuit for updating the value R of the vector discrimination is provided. In this manner, the vector can be generated at a high speed. The registers and the flip-flops are constructed in two stages so that the data for generating the next vector can be prepared while the current vector is generated.

DESCRIPTION OF THE PREFERRED EMBODIMENTS

Figure 4:
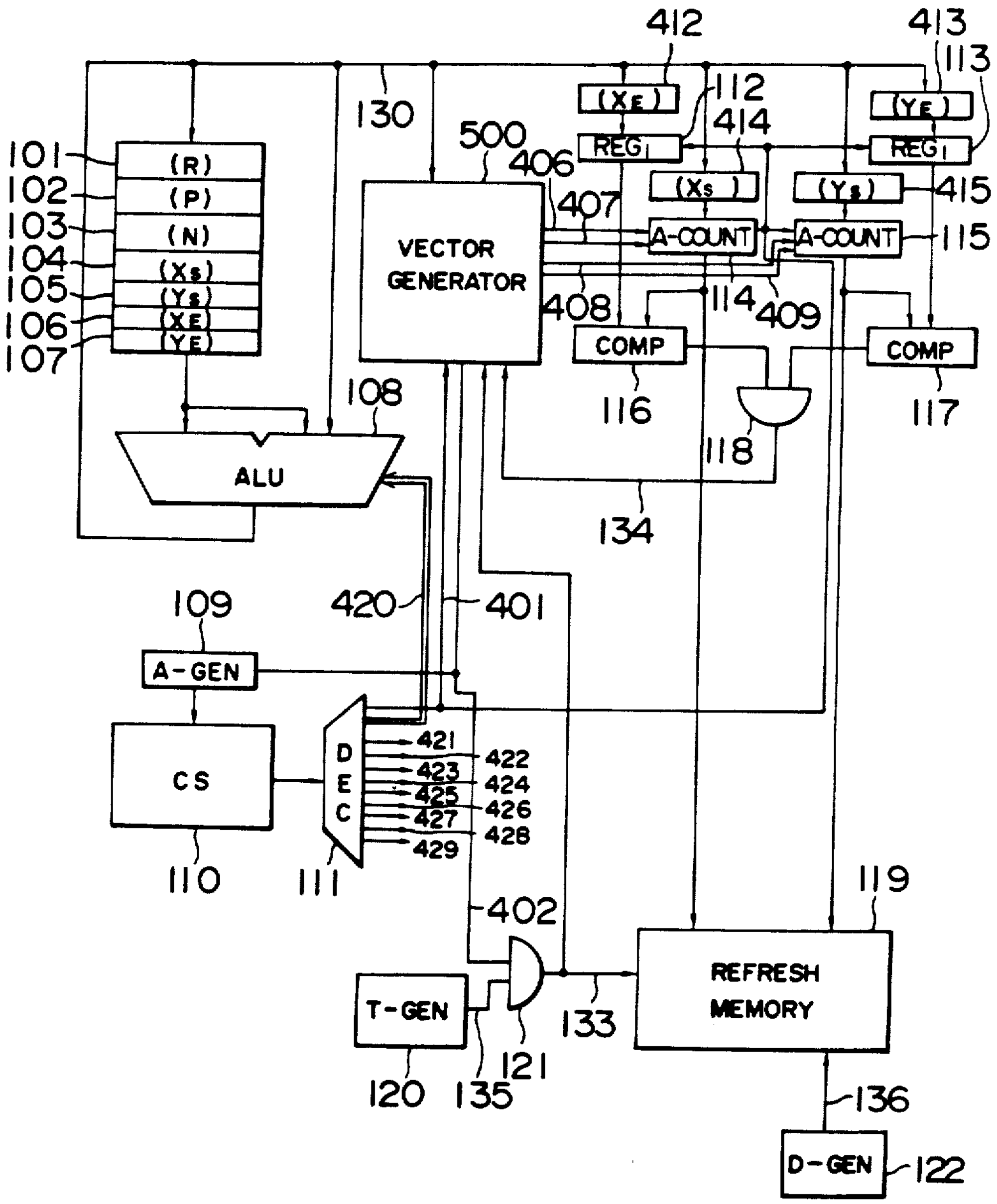
FIG. 4 shows a graphic display apparatus in accordance with one embodiment of the present invention.
Figure 5:
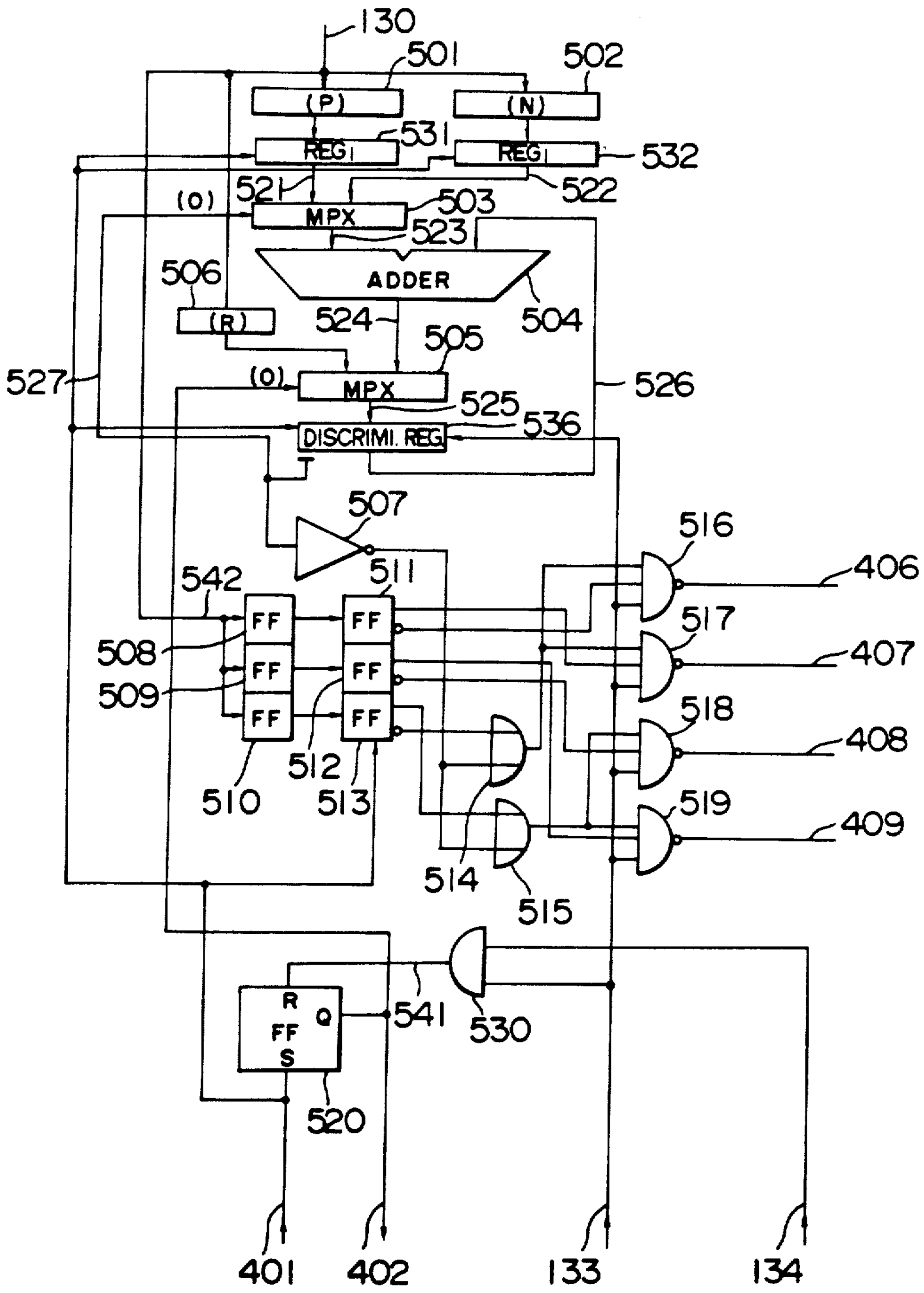
FIG. 5 shows a vector generating circuit used in FIG. 4.

FIG. 4 shows a graphic display apparatus in accordance with an embodiment of the present invention. In FIG. 4, the like numerals to those shown in FIG. 1 designate like elements. Numeral 500 denotes a vector generating circuit. Numerals 414 and 415 denote counters in which start addresses $X_s$ and $Y_s$ of a vector to be generated are set, respectively, and numerals 412 and 413 denote registers in which end addresses $X_E$ and $Y_E$ of the vector are set, respectively. Numerals 104 and 105 denote registers for an X-address ($X_s$) and Y-address ($Y_s$) of a start point $P_s$, respectively. Numerals 106 and 107 denote registers for an X-address ($X_E$) and Y-address ($Y_E$) for an end point $P_E$, respectively. FIG. 5 shows a detail of the vector generating circuit 500. Numerals 501 and 531 denote registers for storing the positive increment P, numerals 502 and 532 denote registers for storing the negative increment N, numeral 503 denotes a multiplexer, numeral 504 denotes an adder, numeral 505 denotes a multiplexer, numerals 506 and 536 denote registers for holding the value R of the discrimination, numeral 507 denotes an inverter, numeral 508 denotes a flip-flop for storing a sign of ΔX, numeral 509 denotes a flip-flop for storing a sign of ΔY, numeral 510 denotes a flip-flop for storing a sign of ΔX-ΔY, numerals 511–513 denote flip-flops for storing the contents of the flip-flops 508–510, respectively, numerals 514 and 515 denote OR gates, numerals 516–519 denote NAND gates and numeral 520 denotes a flip-flop for indicating that the vector generating circuit 500 is in operation.

Figure 2:
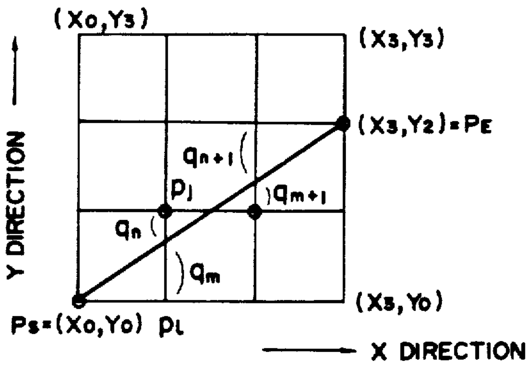
FIG. 2 shows an example of vector to be generated by the apparatus of FIG. 1.
Figure 3:
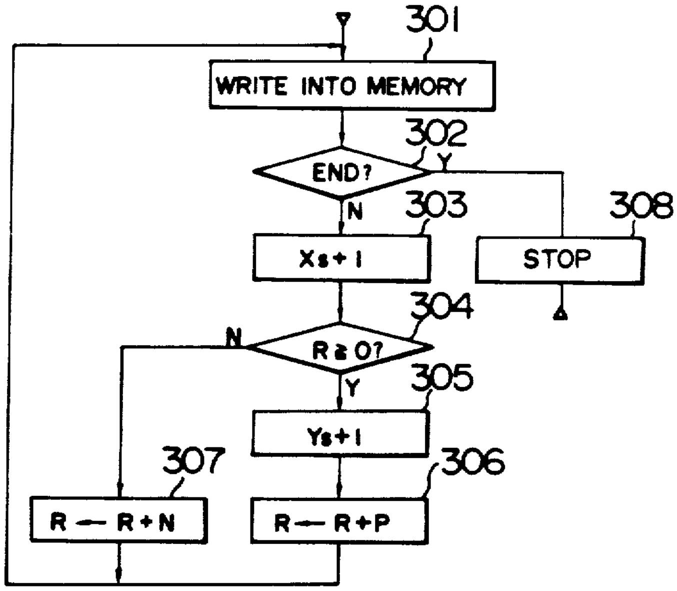
FIG. 3 shows a microprogram flow in the dot generation used in the apparatus of FIG. 1.
Figure 6:
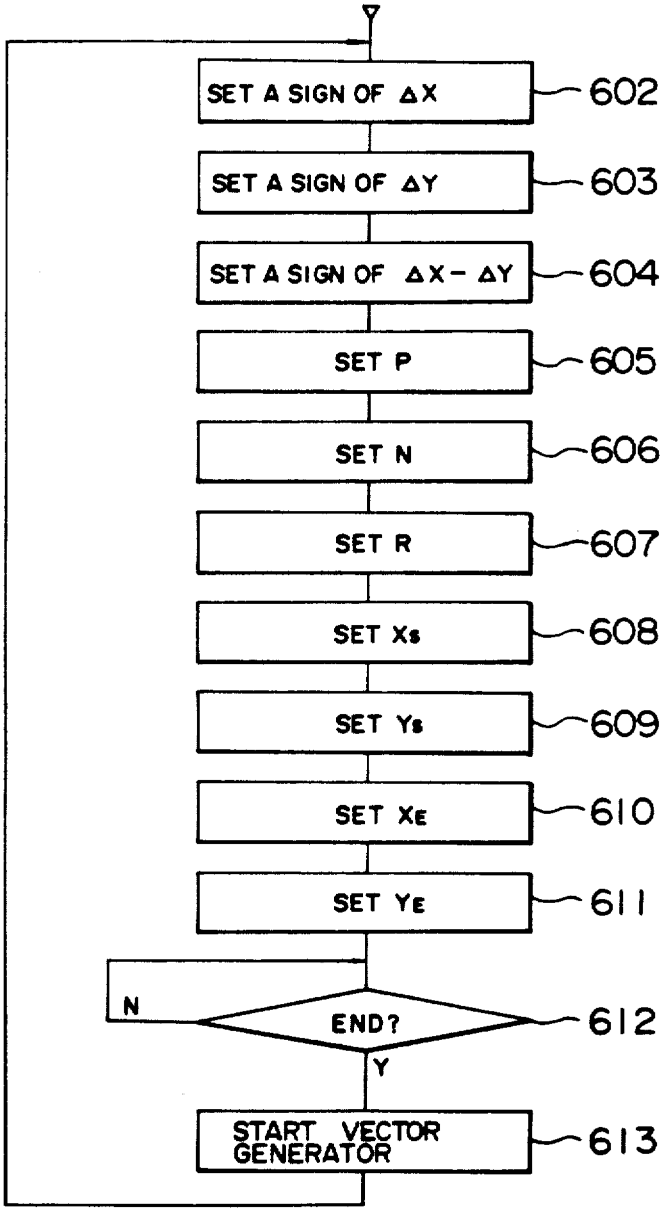
FIG. 6 shows a microprogram for starting the vector generating circuit used in the present invention.
Figure 7:
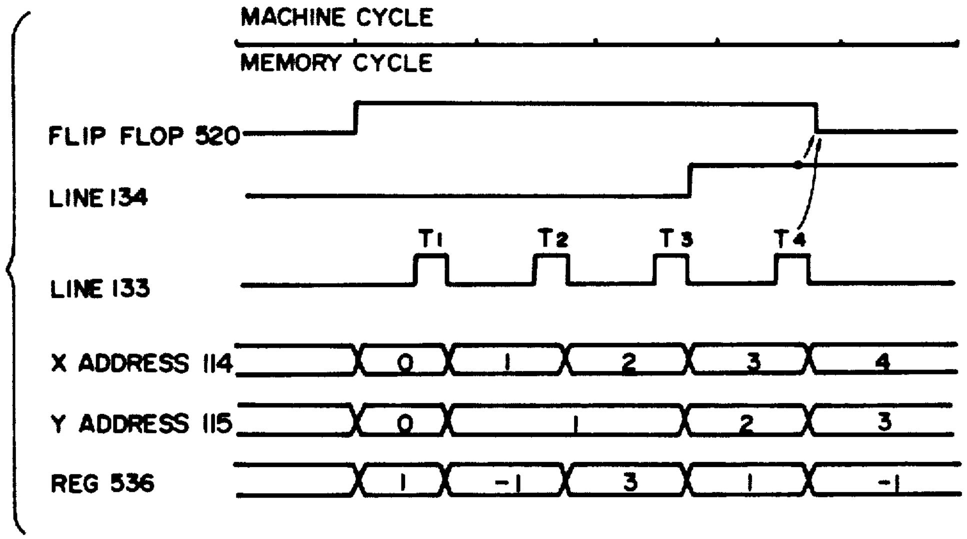
FIG. 7 shows a timing chart for generating the vector.

In order to explain the present embodiment, reference is again made to FIG. 2 to explain the example in which the vector from the point ($X_0$, $Y_0$) to the point ($X_3$, $Y_2$) is generated. It is assumed that the value R of the discrimination, the positive increment P and the negative increment N in the registers 101–103, respectively, have been set in the registers 506, 501 and 502, respectively, and the start point ($X_0$, $Y_0$) and the end point ($X_3$, $Y_2$) have been set in the counters 414 and 415, respectively. The sign of ΔX is set in the flip-flop 508, the sign of ΔY is set in the flip-flop 509 and the sign of ΔX-ΔY is set in the flip-flop 510. Signals for these signs have a logical "0" for a plus sign and a logical "1" for a minus sign. In the present example, ΔX, ΔY and ΔX-ΔY are 3, 2 and 1, respectively. Accordingly, all of the flip-flops 508, 509 and 510 are set to "0". FIG. 6 shows that portion of the microprogram stored in the control storage 110 of FIG. 4, which generates the vector. Referring to FIG. 6, the microinstructions 602 to 612 are executed in order to prepare data necessary for execution of a microinstruction 613, as will be explained later on. When a microinstruction 613 is fetched from the control storage 110, the control line 401 is rendered valid by the decoder 111. In response to the signal on the control line 401, the flip-flop 520 is set as shown in FIG. 7 and the contents of the flip-flops 508–510 are set to the flip-flops 511–513, respectively. The registers 531 and 532 store the outputs of the registers 501 and 502, respectively, in response to the signal 401. The register 536 stores the output of the multiplexer 505 in response to the signal 401. The multiplexer 505 selects the register 506 or the line 524 depending on whether the signal 402 is "0" or "1". At the rise of the signal 401, the signal 402 is still "0". Thus, the multiplexer 505 selects the register 506 at this time. Accordingly, the register 536 stores the value R of the register 506 in response to the signal 401. In the present embodiment, the contents of the flip-flops 511–513 are logical "0" and the values $X_0$, $Y_0$, $X_3$ and $Y_2$ are set in the registers 112, 113, 114 and 115, respectively, and the values $-2$ and 4 are set in the registers 531, 532 and 536. When the flip-flop 520 is set, the signal line 402 is rendered valid. The signal on the signal line 402 is ANDed with the output timing signal 135 from the timing signal generator 120 by the AND gate 121 to produce a timing pulse $T_1$ which is applied to the refresh memory 119 as a write signal 133. At this moment, the outputs of the counters 114 and 115 are supplied to the refresh memory 119 as the address signal. In the present embodiment, the address is ($X_0$, $Y_0$) and "1" is written at the addressed position of the refresh memory 119 at the timing $T_1$ of FIG. 7. The multiplexer 503 selects the line 521 when the control line 527 is logical "0" and selects the line 522 when the control line 527 is logical "1", and connects the selected line to the line 523. The control line 527 is connected to a sign bit field of the register 536 and it is logical "0" when the value of the register 536 is zero or positive, and logical "1" when it is negative. The write signal 133 is also supplied to the register 536. At the rise of the pulse $T_1$, the signal 402 is already "1" so that the multiplexer 505 selects the line 524. On the other hand, the register 536 stores "+1" at this time and the signal 527 is "0". Accordingly, the multiplexer 503 selects the line 521 and the output is "−2". Accordingly, the adder 504 adds the output "−2" and the output "1" of the register 536 to produce an output "−1". Accordingly, at the rise of the write pulse $T_1$, the multiplexer 505 produces the output "−1".

In this manner, the value "−1" is set in the register 506 by the write pulses $T_1$ as shown in FIG. 7.

On the other hand, the write signal 133 is also supplied to the NAND gates 516–519. Those gates are connected to the flip-flops 511–513 through the OR gates 514 and 515. The OR gate 514 receives an inverted output of the flip-flop 513 and an inverted output of the sign bit of the value R of the register 536, inverted by the inverter 507. Accordingly, the OR gate 514 produces an output "1" when $\Delta X\text{-}\Delta Y \geqq 0$ or $R \geqq 0$. The OR gate 515 receives the output of the inverter 507 and the non-inverted output of the flip-flop 513. Accordingly, the OR gate 515 produces an output "1" when $\Delta X\text{-}\Delta Y < 0$ or $R \geqq 0$. The NAND gate 516 receives the output of the OR gate 514, the inverted output of the flip-flop 511 and the write pulse 133. Accordingly, the output 406 of the NAND gate 516 is "0" in response to the write pulse 133 when $\Delta X \geqq 0$ and $\Delta X\text{-}\Delta Y \geqq 0$ or $R \geqq 0$. Unlike the NAND gate 516, the NAND gate 517 receives the non-inverted output of the flip-flop 511. Accordingly, the output 407 of the NAND gate 517 is "0" in response to the write pulse 133 when $\Delta X < 0$ and $\Delta X\text{-}\Delta Y \geqq 0$ or $R \geqq 0$. The NAND gate 518 receives the inverted output of the flip-flop 512 and the output of the OR gate 515. Accordingly, the output 408 of the NAND gate 518 is "0" in response to the write pulse 133 when $\Delta Y < 0$ and $\Delta X\text{-}\Delta Y < 0$ or $R \geqq 0$. Unlike the NAND gate 518, the NAND gate 519 receives the non-inverted output of the flip-flop 512. Accordingly, the output 409 of the NAND gate 519 is "0" in response to the write pulse 133 when $\Delta Y < 0$ and $\Delta X\text{-}\Delta Y < 0$ or $R \geqq 0$. The AND gates 517 and 519 are effective to count down the address (for example, when the vector is to be generated from $P_E$ to $P_s$ in FIG. 2). In the present embodiment, they always produce outputs "0". As described above, in the present embodiment, ΔX, ΔY and ΔX-ΔY are positive, and the content of the register 536 is "1" when the write pulse $T_1$ on the line 133 is generated. Accordingly, the gates 516 and 518 are enabled and the signals 406 and 408 are "0". The signals 406 and 407 are supplied to the address counter 114 and the signals 408 and 409 are supplied to the address counter 115. When the signals 406 and 408 change from "0" to "1", the address counters 114 and 115 count up, respectively, and when the signals 407 and 409 change from "0" to "1", the counters 114 and 115 count down, respectively. In the present embodiment, at the end of writing of the refresh memory 119, that is, when the signal 133 changes from "1" to "0", the signals 406 and 408 change from "0" to "1" and the contents of the address counters 114 and 115 represent $X_1$ and $Y_1$, respectively. At this time, the outputs of the compare circuits 116 and 117 are "0". Accordingly, the signal 134 from the AND gate 118 is not valid and the flip-flop 520 remains in the set state. Therefore, when the next output timing signal 135 is generated, "1" is written into the address ($X_1$, $Y_1$) of the refresh memory 119 by the write pulse $T_2$ shown in FIG. 7. When the write signal 133 changes to "1", the content of the register 536 is "−1" and only the gate 406 is enabled and the contents of the address counters 114 and 115 are $X_2$ and $Y_1$, respectively. The multiplexer 503 selects the line 522 because the value of the register 536 is negative, and a new value "3" is set in the register 536. When the next write pulse $T_3$ is applied to the signal line 135, "1" is written into the address ($X_2$, $Y_1$) of the refresh memory 119, and at the end of writing, the content of the register 536 is "1", and when the signals on the lines 406 and 408 change from "0" to "1", the address counters 114 and 115 are counted up to represent $X_3$ and $Y_2$, respectively. After the dot has been generated at ($X_3$, $Y_2$), the flip-flop 520 is reset by the signal line 531. This state is informed to the microinstruction address generating circuit 109 through the signal line 402. During the generation of the dot, the microinstructions 602–612 (FIG. 6) from the control storage 110 are executed in parallel with the dot generation. The microinstruction 602 supplies the control signal to the ALU 108 to subtract the content of the register 104 from the content of the register 106 to set the sign of ΔX of the vector to be next generated in the flip-flop 508, and produces the control signal 421 to set the sign 542 in the flip-flop 508. The microinstructions 603 and 604 produce the control signal 420 to the ALU 108 to set the sign of ΔY in the flip-flop 509 and set the sign of ΔX-ΔY in the flip-flop 510, respectively, and produce the control signals 422 and 423 to set those signs 542 in the flip-flops 512 and 513, respectively. Similarly, the microinstructions 605–611 produce the control signal 420 to supply the contents of the registers 101, 102, 103, 104, 105, 106 and 107 to the bus 130 to set the values of P, N, R, $X_s$, $Y_s$, $X_E$ and $Y_E$ in the registers 501, 502, 506, 414, 415, 412 and 413, respectively, and produce the control signals 424, 425, 426, 427, 428 and 429 for setting. The microinstruction 612 controls the microinstruction address generating circuit 109 to fetch the microinstruction 613 if the conditioning signal 402 is valid and fetch the microinstruction 612 if the conditioning signal 402 is invalid. Thus, at the end of the dot generation, the conditioning signal 402 is valid and the control is shifted to the microinstruction 613 to execute the next processing.

In this manner, the preparation for generating the next vector is carried out during the generation of the current vector. In the present embodiment, the registers are of two-stage configuration. Even when the registers 412, 413, 414, 415, 501, 502 and 506 and the flip-flops 508, 509 and 510 are not provided, it is possible to generate the vector at a higher speed than the prior art previously considered graphic display apparatus and the purpose of the present invention is attained.

Figure 1:
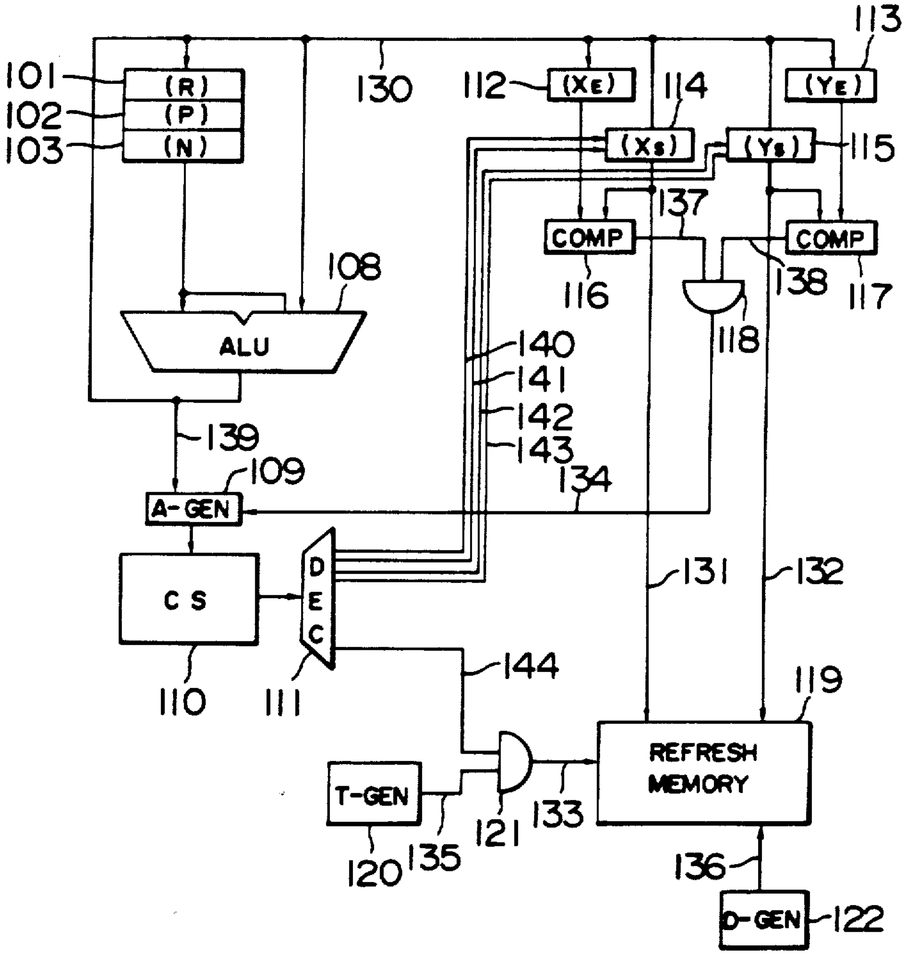
FIG. 1 shows a configuration of a graphic display apparatus, previously considered by the present inventors.

As described hereinabove, according to the present invention, the dot can be generated at the same speed as that of the execution of one microinstruction and hence the vector can be generated five to six times faster than the apparatus of FIG. 1. Since the microprogram control unit can process other jobs during the generation of the vector, the initial value necessary to generate the next vector can be set and the high speed processing is attained.

We claim:

1. A graphic display apparatus for generating vectors, comprising:

a refresh memory for storing dot data used for display of said vectors, said refresh memory including storage locations each corresponding to one of lattice points on a display screen of a display device;

address register means for manifesting one of storage locations of the refresh memory in synchronism with a clock, said storge locations respectively corresponding to positions of dots constituting said vectors;

first means for storing direction data of a vector for which display data is to be stored in said refresh memory;

second means for storing a discrimiation value for the vector;

third means for storing first and second compensation values for the discrimination value, said third means including first and second register means for holding said first and second compensation values;

fourth means for changing the content of said address register means so that said address register means sequentially stores addresses for successive lattice points belonging to said vector, in response to said clock and said direction data stored in said first means and a sign of the discrimination value presently stored in said second means; and fifth means for changing the discrimination value stored in the second means in synchronism with renewal of said addresses stored in said address register means, such that the renewed discrimination value is used for determination of the next address to be stored in said address register means, said fifth means including means for adding the presently stored discrimination value and either of the first and second compensation values stored in said third means in response to a sign of the discrimination value presently stored in the second means, the result of said addition being set into said second means, said fifth means including means for selecting one of the outputs of said first and seond register means in response to a sign bit of said presently stored discrimination value; and an adder means for adding said selected value of said presently stored discrimination value, the output of said adder means being set into said second means in response to said clock.

2. An apparatus of claim 1, further comprising:

a plurality of means for holding plural data for a next vector including an initial value of an address, direction data, a discrimination value, and first and second compensation values, means for simultaneously transferring said plural data for the next vector, respectively to said address register means, first and second means, and first and second register means, in synchronism with end of generation of display data for a preceding vector.

3. A graphic display apparatus for generating vectors, comprising:

a refresh memory for storing dot data used for display of said vectors, said refresh memory including storage locations each corresponding to one of lattice points on a display screen of a display device;

address register means for manifesting one of storge locations of the refresh memory in synchronism with a clock, said storage locations respectively corresponding to positions of dots constituting said vectors;

first means for storing direction data of a vector for which display data is to be stored in said refresh memory;

second means for storing a discrimination value for the vector;

third means for storing first and second compensation values for the discrimination value;

fourth means for changing the content of said address register means so that said address register means sequentially stores addresses for successive lattice points belonging to said vector, in response to said clock and said direction data stored in said first means and a sign of the discrimination value presently stored in said second means; and fifth means for changing the discrimination value stored in the second means in synchronism with renewal of said addresses stored in said address register means, such that the renewed discrimination value is used for determination of the next address to be stored in said address register means, said fifth means including means for adding the presently stored discrimination value and either of the first and second compensation values stored in said third means in response to a sign of the discrimination value presently stored in the second means, the result of said addition being set into said second means.

* * * * *